United States Patent
Brown et al.

(10) Patent No.: US 7,936,915 B2
(45) Date of Patent: May 3, 2011

(54) FOCAL LENGTH ESTIMATION FOR PANORAMIC STITCHING

(75) Inventors: Matthew Brown, Seattle, WA (US); Richard Hartley, Red Hill (AU)

(73) Assignee: Microsoft Corporation, Redmond, WA (US)

( * ) Notice: Subject to any disclaimer, the term of this patent is extended or adjusted under 35 U.S.C. 154(b) by 983 days.

(21) Appl. No.: 11/754,945

(22) Filed: May 29, 2007

(65) Prior Publication Data
US 2008/0298706 A1 Dec. 4, 2008

(51) Int. Cl.
*G06K 9/00* (2006.01)
*G06K 9/40* (2006.01)

(52) U.S. Cl. ........................ 382/154; 382/255

(58) Field of Classification Search .................. 382/154, 382/284, 255; 345/419, 420; 348/347
See application file for complete search history.

(56) References Cited

U.S. PATENT DOCUMENTS

| | | | |
|---|---|---|---|
| 6,011,558 | A | 1/2000 | Hsieh et al. |
| 6,044,181 | A | 3/2000 | Szeliski et al. |
| 6,411,742 | B1 | 6/2002 | Peterson |
| 6,677,981 | B1 | 1/2004 | Mancuso et al. |
| 6,714,249 | B2 | 3/2004 | May et al. |
| 6,978,052 | B2 | 12/2005 | Beged-Dov et al. |
| 7,006,124 | B2 | 2/2006 | Peleg et al. |
| 7,064,783 | B2 | 6/2006 | Colavin et al. |
| 7,479,982 | B2 * | 1/2009 | Otani et al. ................... 348/188 |
| 7,724,977 | B2 * | 5/2010 | Liege et al. ................... 382/254 |
| 2004/0001138 | A1 * | 1/2004 | Weerashinghe et al. ........ 348/36 |
| 2006/0268130 | A1 | 11/2006 | Williams et al. |
| 2007/0098250 | A1 * | 5/2007 | Molgaard et al. ............. 382/154 |

OTHER PUBLICATIONS

Arun, K., T. Huang, and S. D. Blostein, Least-squares fitting of two 3-D point sets, IEEE Trans. on Pattern Analysis and Machine Intelligence, 1987, pp. 698-700, vol. 9.
Bartoli, A., N. Dalal, R. Horaud, Motion Panoramas, J. of Visualization and Comp. Animation, 2003.
Brown, M., D. G. Lowe, Automatic panoramic image stitching using invariant features, Int'l Joint Conf. on Artificial Intelligence, Aug. 2007, pp. 59-73, No. 1.
Brown, M., R. Szeliski, S. Winder, Multi-image matching using multi-scale oriented patches, Proceedings of the 2005 IEEE Comp. Soc. Conf. on Comp. Vision and Pattern Recognition, CVPR'05, 2005, pp. 510-517, vol. 1.
Brown, M., and D. Lowe, Recognizing panoramas, Proc. of the Int'l Conf. on Comp. Vision, 2003, Nice, France, pp. 1218-1225.
Duffin, K. L., W. A. Barrett, Fast focal length solution in partial panoramic image stitching, Proceedings of the 2001 IEEE Computer Society Conference on Computer Vision and Pattern Recognition, 2001, pp. 690-695, vol. 2 Northern Illinois Univ., DeKalb, IL, USA.

(Continued)

*Primary Examiner* — Daniel G Mariam
(74) *Attorney, Agent, or Firm* — Lyon & Harr, LLP; Richard T. Lyon

(57) ABSTRACT

A focal length estimation technique is presented that estimates the focal length used to capture each of a pair of overlapping images taken by a camera rotating about its center. When it is known that the focal length is the same for both images, it is estimated using just two pairs of corresponding points between the images. When it is either unknown whether the focal lengths are the same or it is known that they vary, the focal length of each image is estimated using just three pairs of corresponding points between the images.

19 Claims, 2 Drawing Sheets

OTHER PUBLICATIONS

Fischler, M. A., and R. C. Bolles, Random sample consensus: a paradigm for model fitting with applications to image analysis and automated cartography, Communications of the ACM, 1981, vol. 24, No. 6, pp. 381-395.

Hartley, R. I., Lines and points in three views and the trifocal tensor, Int'l J. of Comp. Vision, 1997, vol. 22, No. 2, pp. 125-140.

Hartley, R. I., Self-calibration from multiple views with a rotating camera, Proceedings of the 3rd European Conf. on Comp. Vision, 1994, pp. 471-478, vol. 1, Stockholm, Sweden.

Hartley, R. I., Self-calibration of stationary cameras, Int'l J. of Comp. Vision, Feb./Mar. 1997, pp. 5-23, vol. 22, No. 1.

Horn, B. K. P., Closed-form solution of absolute orientation using unit quaternions, J. Opt. Soc. Am. A, Apr. 1987, pp. 629-642, vol. 4.

Kang, S. B., R. Weiss, Characterization of errors in compositing panoramic images, Comp. Vision and Image Understanding, Feb. 1999, pp. 269-280, vol. 73, No. 2.

Lowe, D. Distinctive image features from scale-invariant keypoints, Int. J. of Computer Vision, 2004, pp. 91-110, vol. 60, No. 2.

Nistér, D., An efficient solution to the five-point relative pose problem, IEEE Trans. on Pattern Analysis and Machine Intelligence (PAMI), Jun. 2004, pp. 756-770, vol. 26, No. 6.

Pollefeys, M., R. Koch, L. Van Gool, Self-calibration and metric reconstruction in spite of varying and unknown internal camera parameters, Proc. Int'l Conf. on Comp. Vision, 1998, pp. 90-95, Narosa Publishing House.

Stewénius, H., D. Nistér, F. Kahl, F. Schaffalitzky, A minimal solution for relative pose with unknown focal length, Proc. of the 2005 IEEE Comp. Soc. Conf. on Comp. Vision and Pattern Recognition, CVPR'05, 2005, pp. 789-794, vol. 2.

Szeliski, R., H.-Y. Shum, Creating full view panoramic image mosiacs and environment maps, Proceedings of the 24th Annual Int'l Conf. on Computer Graphics and Interactive Techniques, 1997, pp. 251-258.

Torr, P.H.S., and A. Zisserman, Mlesac: A new robust estimator with application to estimating image geometry, Comp. Vision and Image Understanding, 2000, vol. 1, pp. 138-156.

Triggs, B., Autocalibration and the absolute quadric, Proceedings of the Conf. on CVPR, Jun. 1997, pp. 609-614, IEEE Computer Society Press, Puerto Rico, USA.

Triggs, B., P. F. McLAUCHLAN, R. I. Hartley, and A. W. Fitzgibbon, Bundle adjustment—a modern synthesis, Proc. Int'l Workshop on Vision Algorithms, 2000, pp. 298-372.

* cited by examiner

FOCAL LENGTH ESTIMATION FOR PANORAMIC STITCHING

BACKGROUND

Image stitching is the process of combining data from multiple images to form a larger composite image or mosaic. This is possible when the amount of parallax between the images is small or zero, such as when the camera capturing the images is rotating about a point.

Recent successful approaches to image stitching have used feature based techniques to identify matching points between overlapping images, which are used to align the images. These methods typically employ random sampling algorithms such as RANSAC for robust estimation of the image geometry and to cope with noisy and outlier contaminated feature matches. The RANSAC step has an inner loop consisting of a fast solution for the parameters of interest, such as focal length, given a small number of correspondences. Since the probability of choosing a set of correct correspondences decreases rapidly as the sample size increases, solutions that use as few points as possible in the RANSAC loop are favorable. Currently the state of the art approaches use a 4 point linear solution for the homography in the RANSAC loop.

SUMMARY

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

The present technique estimates the focal length used to capture each of a pair of overlapping images depicting part of the same scene, which were taken by a camera rotating about its center. In one case, it is known that the focal length is the same for both images, and in another case it is either unknown whether the focal lengths are the same or it is known that they vary. In both cases, all intrinsic camera parameters except the focal length associated with the camera used to capture the images are known.

When it is known that the focal length is the same for each of the images in the pair, one embodiment of the present technique involves first identifying the location of just two pairs of corresponding points between the images. A polynomial equation that defines the relationship between the common focal length associated with the two images and the positional correspondence of the two pairs of corresponding points is established. The polynomial equation is then solved to determine the value of the shared focal length.

When it is not known whether the focal length is the same for each of the images in the pair, or it is known they vary, one embodiment of the present technique involves identifying the location of just three pairs of corresponding points between the images. A polynomial equation that defines the relationship between the focal length associated with each image and the positional correspondence of the three pairs of corresponding points is then established, and solved to determine the focal length associated with each image.

It is noted that while the foregoing limitations in existing panoramic stitching techniques requiring focal length estimation as described in the Background section can be resolved by a particular implementation of a focal length estimation technique according to the present invention, this is in no way limited to implementations that just solve any or all of the noted disadvantages. Rather, the present focal length estimation technique has a much wider application as will become evident from the descriptions to follow.

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 THE COMPUTING ENVIRONMENT

Before providing a description of embodiments of the present focal length estimation technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
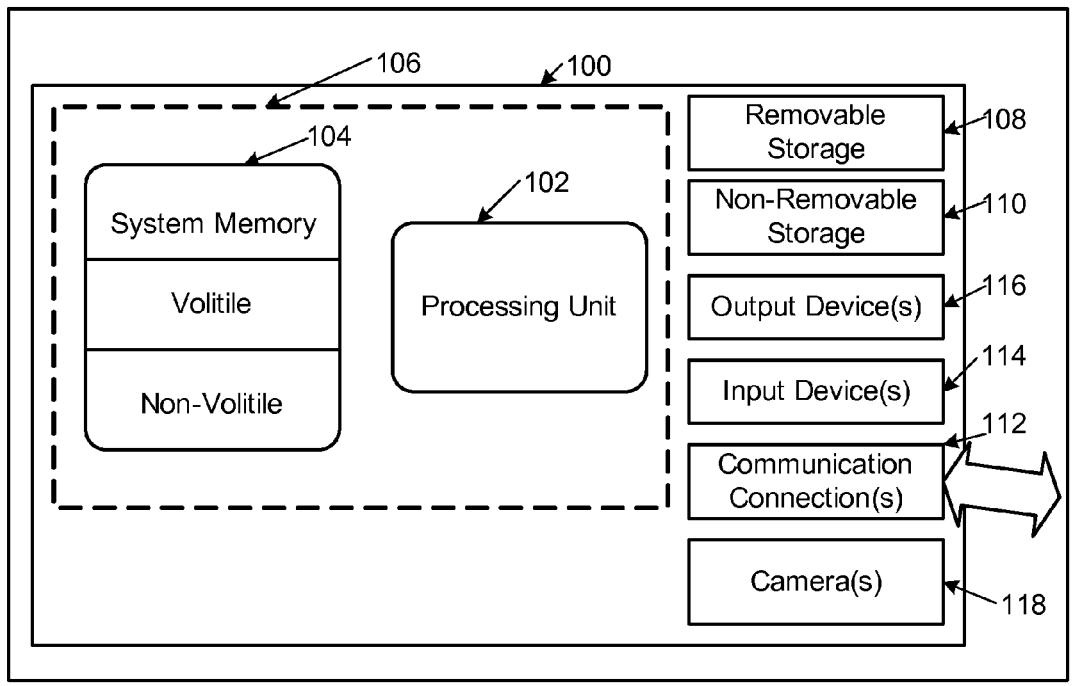
FIG. 1 is a diagram depicting a general purpose computing device constituting an exemplary system for implementing the present invention.

FIG. 1 illustrates an example of a suitable computing system environment. The computing system environment is only one example of a suitable computing environment and is not intended to suggest any limitation as to the scope of use or functionality of the present focal length estimation technique. Neither should the computing environment be interpreted as having any dependency or requirement relating to any one or combination of components illustrated in the exemplary operating environment. With reference to FIG. 1 an exemplary system for implementing the present technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Device 100 can also include a camera 118 (such as a digital/electronic still or video camera, or film/photographic scanner), which is capable of capturing a sequence of images, as an input device. Further, multiple cameras 118 could be included as input devices. The images from the one or more cameras are input into the device 100 via an appropriate interface (not shown). However it is noted that image data can also be input into the device 100 from any computer-readable media as well, without requiring the use of a camera.

The present focal length estimation technique may be described in the general context of computer-executable instructions, such as program modules, being executed by a computing device. Generally, program modules include routines, programs, objects, components, data structures, etc. that perform particular tasks or implement particular abstract data types. The present technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present focal length estimation technique.

2.0 THE FOCAL LENGTH ESTIMATION TECHNIQUE

The present technique estimates the focal length used to capture each image of a sequence of overlapping images (i.e., two or more) taken by a rotating camera. The focal length is estimated from point correspondences in overlapping regions of the images. This technique is an improvement over the previous approaches because it uses fewer points and is more robust. More particularly, the present technique requires only 2 pairs of point correspondences to estimate the focal length used to capture a pair of consecutive images, when it is known the focal length is the same for both images. In cases where it is not known if the focal lengths are the same, or if it is suspected they are different, the present technique requires only 3 pairs of point correspondences to estimate the focal length used to capture each of the pair of consecutive images. These are in contrast to the previous approaches that require a minimum of 4 point correspondences to estimate focal length.

In general, the present technique employs a polynomial model to estimate focal length, rather than the linear model used by previous approaches. Consider two cameras with coincident optical centers viewing a world point X, such that, $$\tilde{u}_1 \sim K_1 X \quad (1)$$

$$\tilde{u}_2 \sim K_2 R X \quad (2)$$

where R is the rotation between the cameras, $K_1, K_2$ are upper triangular calibration matrices and $\tilde{u}_1, \tilde{u}_2$ are the projections of the 3D point X to images 1 and 2. By eliminating X, two constraints are found on the unknown parameters of R (3 parameters) and $K_1, K_2$ (up to 5 parameters each). The goal is to solve for focal length using the minimum number of correspondences possible.

In the past, a linear approach to the problem was taken. More particularly, from equations (1) and (2) it is possible to write, $$\tilde{u}_2 \sim H_{12} \tilde{u}_1 \quad (3)$$

where $$H_{12} \sim K_2 R K_1^{-1}. \quad (4)$$

Eliminating R gives, $$H_{12} \omega^*_1 H_{12}^T \sim \omega^*_1 \quad (5)$$

where $$\omega^*_1 \sim K_1 K_1^T. \quad (6)$$

The parameter $\omega^*_1$ is known as the dual image of the absolute conic (DIAC). Linear algorithms proceed by computing a general 3×3 matrix $H_{12}$ from 4 point correspondences. The symmetric system of Eq. (5) then gives 5 linear constraints on the elements of $\omega^*_1$ and $\omega^*_2$. $K_1$ and $K_2$ can be found by Cholesky decomposition of $\omega^*_1$ and $\omega^*_2$. Thus, the linear approach requires 4 point correspondences to be known.

However, instead of linearizing, the present technique employs a polynomial model to work directly with the sought after parameters K. Consider a pair of correspondences $u_{11} \leftrightarrow u_{21}$, $u_{12} \leftrightarrow u_{22}$ where, $$\tilde{u}_{11} \sim K_i R_i X_j \quad (7)$$

It is possible to eliminate $R_i$ by considering the angle between $X_1$ and $X_2$, i.e., $$\cos^2 \theta = \frac{(X_1^T X_2)^2}{|X_1|^2 |X_2|^2}, \quad (8)$$

Noting that this angle is preserved in both images, i.e.

$$\cos^2 \theta_1 = \cos^2 \theta_2 \quad (9)$$

and writing in terms of the camera parameters gives a polynomial expression, $$\frac{(\tilde{u}_{11}^T \omega_1 \tilde{u}_{12})^2}{\tilde{u}_{11}^T \omega_1 \tilde{u}_{11} \tilde{u}_{12}^T \omega_1 \tilde{u}_{12}} = \frac{(\tilde{u}_{21}^T \omega_2 \tilde{u}_{22})^2}{\tilde{u}_{21}^T \omega_2 \tilde{u}_{21} \tilde{u}_{22}^T \omega_2 \tilde{u}_{22}} \quad (10)$$

where $\omega_i^{-1} \sim \omega^*_i \sim K_i^{-1} K_i^{-1}$. This gives a single nonlinear constraint on the unknown parameters of $K_1$, $K_2$, and is used as a building block for the polynomial solvers to be described next.

2.1 Estimating Focal Length Using 2 Pairs of Point Correspondences

A simple case arises when the focal length used to capture two consecutive overlapping images taken by a camera rotating about its center is unknown, but it is known that the focal length is the same for each image. This occurs frequently in practice, for example, when capturing a panorama without zooming. It is noted that all the other intrinsic camera parameters are already known for each image.

Figure 2:
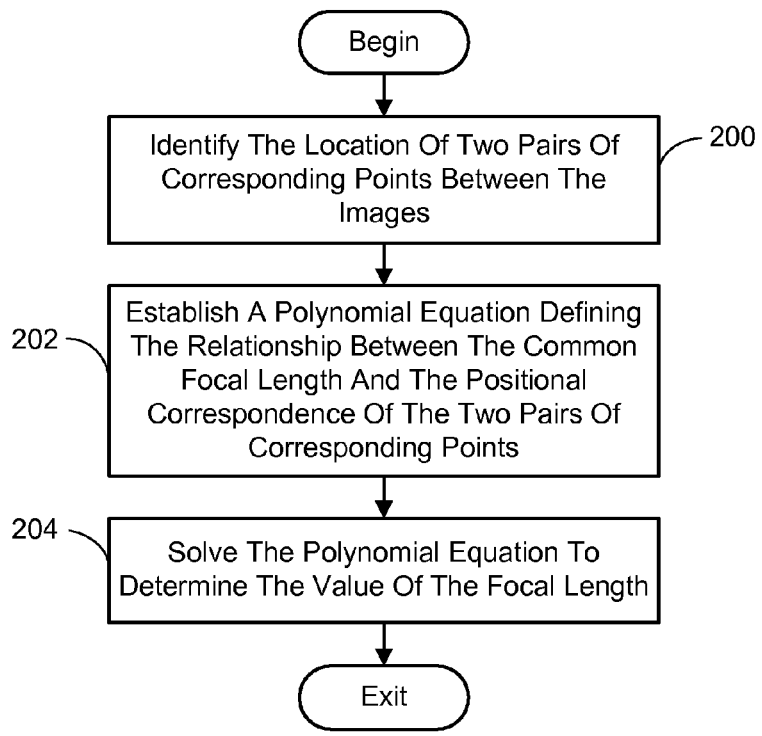
FIG. 2 is a flow diagram generally outlining one embodiment of a process for estimating the focal length used to capture each of a pair of images depicting part of the same scene in a case where it is known that the focal length is the same for both images, all intrinsic camera parameters except the focal length associated with a camera used to capture each image are known, and the rotation between the two images was about the camera center.

In one embodiment of the present technique, the common focal length between the two images is computed as generally shown in the process flow diagram of FIG. 2. The technique begins by identifying the location of just two pairs of corresponding points between the images (200). Each pair of corresponding points represents the same point in the scene as depicted in the two images. Next, a polynomial equation which defines the relationship between the focal length associated with the two images and the positional correspondence of the two pairs of corresponding points is established (202). The polynomial equation is then solved to determine the value of the shared focal length (204). It is noted that the use of just two pairs of corresponding points represents the minimal number of point pals needed to solve the equation.

In regard to identifying the location of pairs of corresponding points, in one embodiment this is accomplished using any appropriate feature detection technique, such as the Scale-Invariant Feature Transform (SIFT) method. In another embodiment, the corresponding point pairs can be identified manually, by a user specifying the location of matching points in each image.

In regard to establishing and solving the polynomial equation, the foregoing technique for estimating the common focal length using just 2 pairs of corresponding points between the images can be implemented as follows.

Substituting $$K_i = \begin{bmatrix} f & 0 & 0 \\ 0 & f & 0 \\ 0 & 0 & 1 \end{bmatrix} \quad (11)$$

in Eq. (10) gives $$\frac{(a_{12} + f^2)^2}{(a_1 + f^2)(a_2 + f^2)} = \frac{(b_{12} + f^2)^2}{(b_1 + f^2)(b_2 + f^2)} \quad (12)$$

where $$a_{12} = u_{11}^T u_{12}, a_1 = |u_{11}|^2, a_2 = |u_{12}|^2, b_{12} = u_{21}^T u_{22},$$
$$b_1 = |u_{21}|^2, b_2 = |u_{22}|^2. \quad (13)$$

Eq. (12) is easily simplified to give a 3rd degree polynomial in $f^2$ which can be solved in closed form.

2.2 Estimating Focal Length Using 3 Pairs of Point Correspondences

Another important practical case occurs when the focal length is unknown and potentially different between the two views. This might occur when capturing a panorama with variable zoom. Here again, the focal lengths of two consecutive overlapping images taken by a camera rotating about its center are to be determined, and it is assumed that all the other intrinsic camera parameters are already known for each image.

Figure 3:
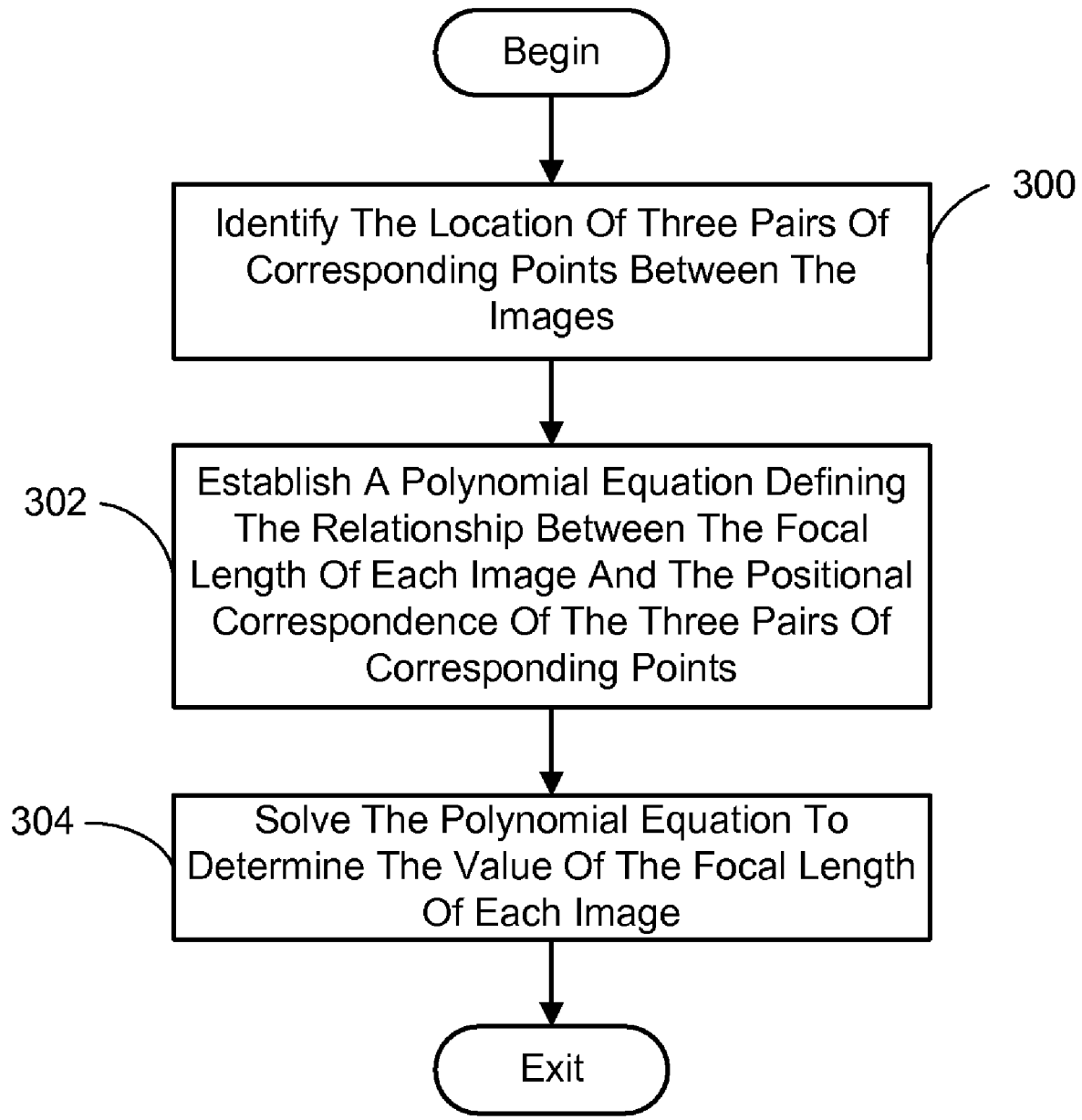
FIG. 3 is a flow diagram generally outlining one embodiment of a process for estimating the focal length used to capture each of a pair of images depicting part of the same scene in a case where the focal length may be different for each image, all intrinsic camera parameters except the focal length associated with a camera used to capture each image are known, and the rotation between the two images was about the camera center.

In one embodiment of the present technique, the focal length for each of the two images is computed as generally shown in the process flow diagram of FIG. 3. The technique begins by identifying the location of only three pairs of corresponding points between the images (300). This is accomplished as described previously for the common focal length case. A polynomial equation which defines the relationship between the focal length associated with each image and the positional correspondence of the three pairs of corresponding points is then established (302). This polynomial equation is then solved to determine the value of the focal length associated with each image (304).

In regard to establishing and solving the polynomial equations the foregoing technique for estimating the focal lengths of the two images using just 3 pairs of corresponding points can be implemented as follows.

Substituting $$K_i = \begin{bmatrix} f_i & 0 & 0 \\ 0 & f_i & 0 \\ 0 & 0 & 1 \end{bmatrix} \quad (14)$$

in Eq. (10) gives $$\frac{(a_{12} + f_1^2)^2}{(a_1 + f_1^2)(a_2 + f_1^2)} = \frac{(b_{12} + f_2^2)^2}{(b_1 + f_2^2)(b_2 + f_2^2)} \quad (15)$$

This can be simplified to give a biquadratic equation in $f_1^2$ and $f_2^2$. Writing this as a quadratic in $f_1^2$ gives $$p f_1^4 + q f_1^2 r = 0 \quad (16)$$

where $$p = f_2^2 (b_1 + b_2 - 2 b_{12}) + b_1 b_2 - b_{12}^2,$$

$$q = f_2^4(2a_{12}-a_1-a_2) + f_2^2(2a_{12}^2(b_1+b_2) - 2b_{12}(a_1+a_2)) + 2a_{12}b_1b_2 - (a_1+a_2)b_{12}^2,$$

$$r = f_2^4(a_{12}^2 - a_1a_2) + f_2^2(a_{12}^2(b_1+b_2) - 2a_1a_2b_{12}) + a_{12}^2 b_1 b_2 - a_1 a_2 b_{12}^2, \qquad (17)$$

Note that p is 1st degree and q and r are second degree polynomials in $f_2^2$. Taking 2 pairs of points gives the simultaneous equations $$p_1 f_1^4 + q_1 f_1^2 + r_1 = 0 \qquad (18)$$

$$p_2 f_1^4 + q_2 f_1^2 + r_2 = 0 \qquad (19)$$

The common solutions of the polynomials are the roots of the resultant R $$R = \det \begin{bmatrix} p_1 & q_1 & r_1 & 0 \\ 0 & p_1 & q_1 & r_1 \\ p_2 & q_2 & r_2 & 0 \\ 0 & p_2 & q_2 & r_2 \end{bmatrix} \qquad (20)$$

This is a 7th degree polynomial in $f_2^2$. The real roots of this polynomial may be found by a numeric technique. Only real positive roots are retained, and the value of $f_2$ is found by taking a square root. $f_1^2$ is then obtained by solving the quadratic Eq. (16). Only real positive roots are of interest, $f_1$ is then found by taking a square root.

3.0 APPLICATIONS AND OTHER EMBODIMENTS

The present focal length estimation technique can be used to estimate the focal length of each pair of overlapping images captured by a camera rotated about its center as part of creating a panorama. More particularly, the focal lengths would be used stitch the images of the panorama together. Of course, if it known the focal length is the same for all the images, it need only be computed for a single consecutive pair of images using the foregoing 2 point pair embodiment and then employed for all the remaining images. However, if it is not known whether the focal length is the same for every image, or it is suspected that it varies, then the foregoing 3 point pair embodiment is used to compute the focal length for each image in the panorama.

It should also be noted that any or all of the aforementioned embodiments throughout the description may be used in any combination desired to form additional hybrid embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for estimating the focal length used to capture each of a pair of images depicting part of the same scene in a case where it is known that the focal length is the same for both images, all intrinsic camera parameters except the focal length associated with a camera used to capture each image are known, and a rotation between the two images was about the camera center, said process comprising using a computer to perform the following process actions:

identifying the locations of only two pairs of corresponding points between the images, wherein each pair of the corresponding points represents the same point in the scene as depicted in the two images;

establishing a polynomial equation which defines a relationship between the focal length associated with the two images and a positional correspondence of the identified two pairs of corresponding points; and solving the polynomial equation to determine the value of a shared focal length associated with the pair of images, wherein the use of just two pairs of corresponding points represents the minimal number of point pairs needed to solve the equation.

2. The process of claim 1, wherein the process action of establishing a polynomial equation which defines the relationship between the focal length associated with the two images and the positional correspondence of the identified two pairs of corresponding points, comprises an action of establishing the polynomial equation as, $$\frac{(a_{12}+f^2)^2}{(a_1+f^2)(a_2+f^2)} = \frac{(b_{12}+f^2)^2}{(b_1+f^2)(b_2+f^2)},$$

wherein $a_{12} = u_{11}^T u_{12}$, $a_1 = |u_{11}|^2$, $a_2 = |u_{12}|^2$, $b_{12} = u_{21}^T u_{22}$, $b_1 = |u_{21}|^2$, $b_2 = |u_{22}|^2$, f is the focal length, $u_{11}$ and $u_{21}$ are the corresponding points in the first pair of corresponding points and $u_{12}$ and $u_{22}$ are the corresponding points in the second pair of corresponding points.

3. The process of claim 2, wherein the process action of solving the polynomial equation to determine the value of the shared focal length associated with the pair of images, comprises the actions of:

simplifying the established polynomial equation to give a third degree polynomial in $f^2$; and solve the simplified polynomial for f.

4. The process of claim 1, wherein at least one pair of corresponding points between the images is identified using a feature detection technique.

5. The process of claim 1, wherein at least one pair of corresponding points between the images is specified by a user.

6. The process of claim 1, wherein capturing each of the pair of images depicting part of the same scene in the case where it is known that the focal length is the same for both images and the rotation between the two images was about the camera center is accomplished as part of capturing overlapping images to create a panorama wherein the camera is rotated without zooming.

7. The process of claim 6, wherein the focal length computed for said pair of images is used as the focal length for all the other images captured as part of the creation of the panorama.

8. The process of claim 1, further comprising a process action of using the computed focal length in an image stitching operation to stitch the pair of images together.

9. A computer-implemented process for estimating the focal length used to capture each of a pair of images depicting part of the same scene in a case where it is not known that the focal length is the same for both images and all intrinsic camera parameters except the focal length associated with a camera used to capture each image are known, and a rotation between the two images was about the camera center, said process comprising using a computer to perform the following process actions:

identifying the locations of only three pairs of corresponding points between the images, wherein each pair of the corresponding points represents the same point in the scene as depicted in the two images;

establishing a polynomial equation which defines a relationship between the focal length associated with each image and a positional correspondence of the identified three pairs of corresponding points; and solving the polynomial equation to determine the value of the focal length associated with each image.

10. The process of claim 9, wherein it is unknown whether the focal length used in capturing each image is the same or not.

11. The process of claim 9, wherein it is known that the focal length used in capturing each image was different.

12. The process of claim 9, wherein the process action of establishing a polynomial equation which defines the relationship between the focal length associated with each image and the positional correspondence of the identified three pairs of corresponding points, comprises the actions of:

establishing the polynomial equation as, $$\frac{(a_{12}+f_1^2)^2}{(a_1+f_1^2)(a_2+f_1^2)} = \frac{(b_{12}+f_2^2)^2}{(b_1+f_2^2)(b_2+f_2^2)};$$

simplifying the polynomial equation as a quadratic in $f_1^2$ as, $pf_1^4 + qf_1^2 = 0$, wherein, $p = f_2^2(b_1+b_2-2b_{12}) + b_1 b_2 - b_{12}^2$, $q = f_2^4(2a_{12}-a_1-a_2) + f_2^2(2a_{12}(b_1+b_2) - 2b_{12}(a_1+a_2)) + 2a_{12}b_1 b_2 - (a_1+a_2)b_{12}^2$, and $r = f_2^4(a_{12}^2 - a_1 a_2) + f_2^2(a_{12}^2(b_1+b_2) - 2a_1 a_2 b_{12}) + a_{12}^2 b_1 b_2 - a_1 a_2 b_{12}^2$, and wherein $a_{12} = u_{11}^T u_{12}$, $a_1 = |u_{11}|^2$, $a_2 = |u_{12}|^2$, $b_{12} = u_{21}^T u_{22}$, $b_1 = |u_{21}|^2$, $b_2 = |u_{22}|^2$, $f_1$ is the focal length of the first image, $f_2$ is the focal length of the second image, $u_{11}$ and $u_{21}$ are the corresponding points in a first pair of corresponding points, and $u_{12}$ and $u_{22}$ are the corresponding points in a second pair of corresponding points.

13. The process of claim 12, wherein the process action of solving the polynomial equation to determine the value of the focal length associated with each image, comprises the actions of:

employing a first pair of the three pairs of corresponding points to produce a first simultaneous equation $p_1 f_1^4 + q_1 f_1^2 + r_1 = 0$;

employing a second pair of the three pairs of corresponding points which is different from the first pair to produce a second simultaneous equation $p_2 f_1^4 + q_2 f_1^2 + r_2 = 0$; and solving the simultaneous equations for $f_1$ and $f_2$.

14. The process of claim 13, wherein the process action of solving the simultaneous equations for $f_1$ and $f_2$, comprises the actions of:

forming a resultant R wherein, $$R = \det \begin{bmatrix} p_1 & q_1 & r_1 & 0 \\ 0 & p_1 & q_1 & r_1 \\ p_2 & q_2 & r_2 & 0 \\ 0 & p_2 & q_2 & r_2 \end{bmatrix}$$

which is a seventh degree polynomial in $f_2^2$;

finding the roots of said seventh degree polynomial and computing $f_2$; and computing $f_1$ using the equation $pf_1^4 + qf_1^2 + r = 0$.

15. The process of claim 9, wherein at least one pair of corresponding points between the images is identified using a feature detection technique.

16. The process of claim 9, wherein at least one pair of corresponding points between the images is specified by a user.

17. The process of claim 9, wherein capturing each of the pair of images depicting part of the same scene in the case where the rotation between the two images was about the camera center is accomplished as part of capturing overlapping images to create a panorama wherein the camera is rotated with variable zooming.

18. The process of claim 17, wherein the identifying, establishing and solving actions are repeated for each pair of images captured as part of the creation of the panorama.

19. The process of claim 9, further comprising a process action of using the computed focal lengths in an image stitching operation to stitch the pair of images together.

* * * * *